United States Patent
Kim et al.

(10) Patent No.: US 10,711,682 B2
(45) Date of Patent: Jul. 14, 2020

(54) METHOD AND SYSTEM FOR DIAGNOSING FAILURE OF PISTON COOLING DEVICE

(71) Applicants: Hyundai Motor Company, Seoul (KR); Kia Motors Corporation, Seoul (KR)

(72) Inventors: Jin-Sung Kim, Seoul (KR); Kwang-Seok Choi, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 180 days.

(21) Appl. No.: 15/836,607

(22) Filed: Dec. 8, 2017

(65) Prior Publication Data

US 2019/0078493 A1   Mar. 14, 2019

(30) Foreign Application Priority Data

Sep. 8, 2017   (KR) .................. 10-2017-0115095

(51) Int. Cl.
*F01P 3/08* (2006.01)
*F02D 35/02* (2006.01)
(Continued)

(52) U.S. Cl.
CPC .............. *F01P 3/08* (2013.01); *F01M 1/02* (2013.01); *F01M 1/08* (2013.01); *F01M 1/18* (2013.01); *F02D 35/02* (2013.01); *F02D 41/22* (2013.01); *F02D 41/221* (2013.01); *F02F 3/16* (2013.01); *F01M 2001/0246* (2013.01); *F01P 2031/20* (2013.01); *F02D 2041/227* (2013.01); *F02D 2200/021* (2013.01); *F02D 2250/26* (2013.01)

(58) Field of Classification Search
CPC .......... F01P 3/08; F01P 2031/20; F01M 1/08; F02D 41/221; F02D 35/02; F02D 2250/26; F02D 2200/021; F02D 2041/227; F02F 3/16
See application file for complete search history.

(56) References Cited

U.S. PATENT DOCUMENTS

2003/0011240 A1* 1/2003 Dunbar .................. B60T 13/16
                                                                303/13
2014/0182547 A1* 7/2014 Kim ................... F02D 13/0207
                                                               123/395
(Continued)

FOREIGN PATENT DOCUMENTS

| CN | 104989692 A | * | 10/2015 |
| KR | 10-2004-0029739 | | 4/2004 |
| KR | 101470235 B1 | * | 12/2014 |

*Primary Examiner* — Jacob M Amick
*Assistant Examiner* — Charles Brauch
(74) *Attorney, Agent, or Firm* — Mintz Levin Cohn Ferris Glovsky and Popeo, P.C.; Peter F. Corless (57) ABSTRACT

A method for diagnosing a failure of a solenoid valve of a piston cooling device is provided. The method includes varying a pressure in a variable proportional control oil pump when an opening command or a closing command of the solenoid valve is sent to inject oil from the piston cooling device. Additionally, a variation of an oil pressure in an oil flow path of the piston cooling device is monitoring according to a variation of the pressure in the variable proportional control oil pump and whether a failure occurs at the solenoid valve of the piston cooling device is then determined.

12 Claims, 4 Drawing Sheets

(51) Int. Cl.
*F02F 3/16* (2006.01)
*F02D 41/22* (2006.01)
*F01M 1/08* (2006.01)
*F01M 1/18* (2006.01)
*F01M 1/02* (2006.01)

(56) References Cited

U.S. PATENT DOCUMENTS

2015/0167566 A1* 6/2015 Mok .................... F01P 3/00
    701/102
2015/0377115 A1* 12/2015 Shinagawa ............. F02P 5/152
    123/41.15

* cited by examiner

METHOD AND SYSTEM FOR DIAGNOSING FAILURE OF PISTON COOLING DEVICE

CROSS-REFERENCE TO RELATED APPLICATIONS

This application claims priority to Korean Patent Application No. 10-2017-0115095, filed on Sep. 8, 2017, which is incorporated herein by reference in its entirety.

BACKGROUND

Field of the Invention

The present disclosure relates to a method for diagnosing failure of a piston cooling device, and more particularly, to a diagnosis method and a diagnosis system, which are capable of diagnosing whether a failure occurs at a piston cooling jet when an engine is started.

Description of Related Art

A piston cooling device is a device configured to cool a piston exposed to a high temperature and a high pressure to maintain heat resistance and durability thereof. A piston cooling jet is known as a type of piston cooling device and injects oil of an oil pan into a piston of an engine to cool a piston exposed to a high temperature and a high pressure. Recently, as emission regulation is strengthened, a piston cooling jet solenoid valve system has been applied in a cold state of the engine, wherein a solenoid valve helps to warm up the engine and suppress generation of exhaust gas by blocking a flow path toward the piston cooling jet solenoid valve system by a solenoid valve.

Figure 4:
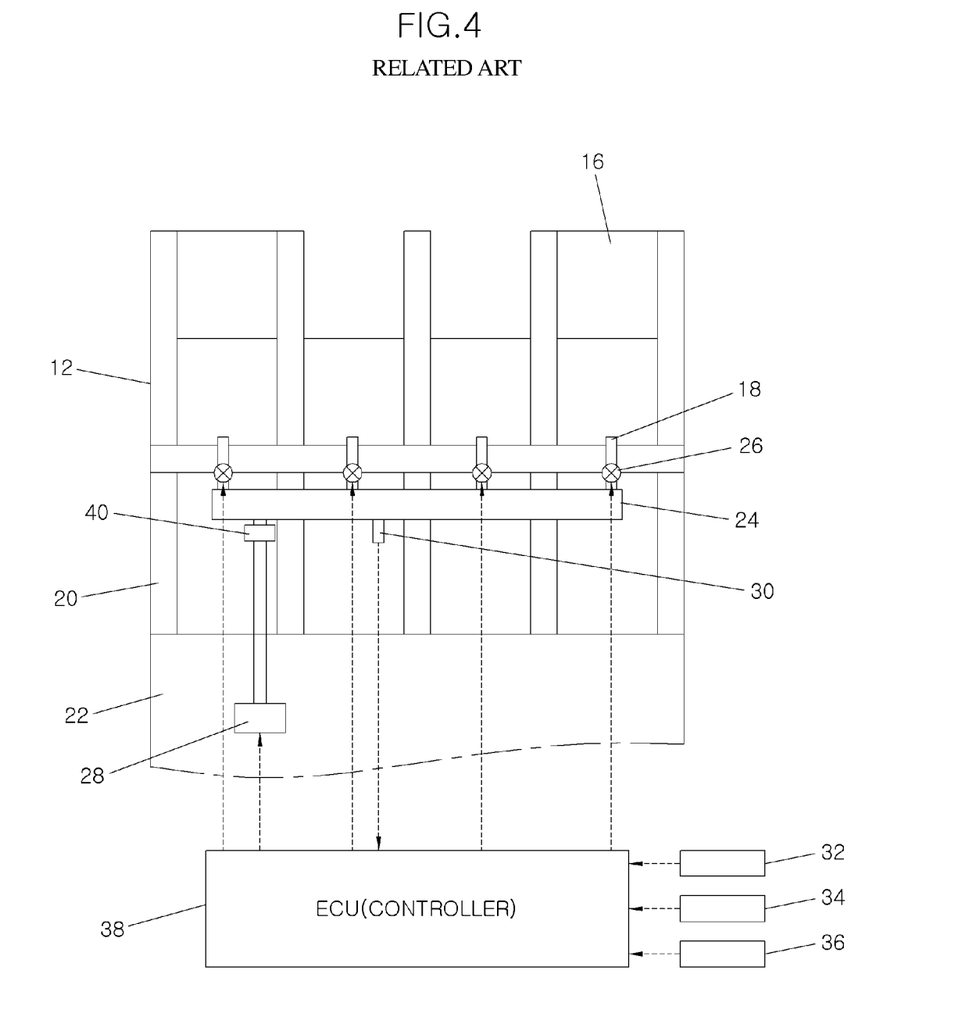
FIG. 4 is a diagram schematically illustrating a piston cooling solenoid valve system according to the related art.

FIG. 4 is a diagram illustrating a specific configuration of a solenoid valve piston cooling jet system disclosed in the related art. As shown in FIG. 4, a cooling jet 18 configured to inject oil to each of pistons 16 is installed at a cylinder block 12. A crankcase 20 is disposed below the cylinder block 12, an oil fan 22 configured to store oil is provided below the crankcase 20, a sub-gallery 24 communicated with the cooling jet 18 is installed inside the crankcase 20, a solenoid valve 26, which is opened and closed under the control of an electronic control unit (ECU) which will be described below, is installed at an oil inlet of the jet 18, and an oil pump 28 configured to pump the oil in the oil fan 22 to maintain oil inside the sub-gallery 24 is installed inside the oil fan 22.

Further, the solenoid valve piston cooling jet system includes an oil pressure sensor 30 configured to sense an oil pressure inside the sub-gallery 24 and installed thereon, an oil temperature sensor 32 configured to sense a temperature of the oil inside the oil fan 22 and installed at an interior of the oil fan 22, a piston position detection sensor 34 configured to detect a position of the piston 16 and installed at the cylinder block 12, an engine speed sensor 36 configured to detect a speed of the engine by sensing a rotation of a crank, and an ECU 38 configured to operate the solenoid valve 26 by receiving signals of the oil temperature sensor 32, the piston position detection sensor 34, and the engine speed sensor 36, and operate the oil pump 28 by receiving a signal of the oil pressure sensor 30.

A check valve 40 configured to prevent a back flow of the oil to maintain a constant oil pressure inside the sub-gallery 24 as long as the cooling Jet 18 does not inject the oil is disposed at a flow path that provides communication between the oil pump 28 and the sub-gallery 24. Since the above-described solenoid valve piston cooling jet system is a component that affects exhaust gas, it is essential to perform a periodic failure diagnosis. Therefore, an oil pressure switch or sensor is conventionally disposed at a flow path of the piston cooling jet. The oil pressure switch or sensor monitors a variation of an oil pressure in the flow path of the piston cooling jet to determine whether the solenoid valve 26 of the piston cooling jet is in an open-stuck state or a closing-stuck state.

However, such a conventional method for determining a solenoid valve failure is unable to be used after the engine is started due to a characteristic of the conventional method. In particular, after the solenoid valve 26 of the piston cooling jet is opened for the first time, a pressure is formed in an oil flow path of the piston cooling jet irrespective of an opening or closing state of the piston cooling jet causing diagnosis to be difficult. Consequently, the conventional method for determining a solenoid valve failure is used only when ignition is in an OFF state or in a key-on state, and, after the engine is started, that is, after a solenoid valve of the piston cooling jet is opened for the first time, failure determination becomes difficult, thus causing inaccurate diagnosis results.

SUMMARY

An exemplary embodiment of the present disclosure provides a diagnosis method and a diagnosis system, which are capable of more accurately diagnosing whether a failure occurs at a piston cooling jet when an engine is started.

An exemplary embodiment of the present disclosure provides a method for diagnosing a failure of a solenoid valve of a piston cooling device that may include, when an opening command or a closing command of the solenoid valve is transmitted to inject oil from the piston cooling device, varying a pressure in a variable proportional control oil pump; monitoring a variation of an oil pressure in an oil flow path of the piston cooling device based on a variation of the pressure in the variable proportional control oil pump; and determining whether a failure occurs at the solenoid valve of the piston cooling device.

More specifically, the method may further include, when the solenoid valve is in a state in which the closing command is transmitted, varying an oil discharge pressure of the variable proportional control oil pump; determining whether a variation occurs at an oil pressure switch configured to monitor a pressure of oil supplied to the piston cooling device; and, when a variation occurs in the oil pressure in the oil flow path as the result of the monitoring of the variation of the oil pressure in the oil flow path by the oil pressure switch, determining that an open-stuck failure occurs at the solenoid valve of the piston cooling device.

Additionally, the method may further include, when the solenoid valve is in a state in which the opening command is transmitted, varying an oil discharge pressure of the variable proportional control oil pump; determining whether a variation occurs at an oil pressure switch configured to monitor a pressure of oil supplied to the piston cooling device; and, when no variation occurs in the oil pressure in the oil flow path as the result of the monitoring of the variation of the oil pressure in the oil flow path by the oil pressure switch, determining that a closing-stuck failure occurs at the solenoid valve of the piston cooling device.

The method may further include, when the failure is determined to occur at the piston cooling device, warning a driver of a failure occurrence of the piston cooling device using a failure display. Additionally, the method may further include, when the failure is determined to occur at the piston cooling device, restricting an output of an engine when a temperature of cooling water of the engine is equal to or greater than a preset temperature.

Another exemplary embodiment of the present disclosure provides a system for diagnosing a failure of a solenoid valve of a piston cooling device that may include a piston cooling jet installed at a cylinder block and configured to inject oil in an oil pan into a piston; an oil pressure switch or an oil pressure sensor configured to monitor a pressure of oil supplied to the piston cooling device; a variable proportional control oil pump configured to form an oil pressure of an engine; a piston cooling jet solenoid valve configured to open and close a supply flow path supplying oil, formed by the variable proportional control oil pump, to the piston cooling jet; and an electronic control unit (ECU) configured to operate the variable proportional control oil pump, receive information regarding whether a variation occurs in an oil pressure value from the oil pressure switch or the oil pressure sensor, and determine whether a failure occurs at the solenoid valve of the piston cooling device.

The ECU may be configured to transmit an opening or closing command to the solenoid valve of the piston cooling device, operate the variable proportional control oil pump to vary an oil discharge pressure discharged therefrom, and determine whether a variation occurs in the oil pressure value from the oil pressure switch or the oil pressure sensor to determine whether a failure occurs at the piston cooling device. In addition, when the solenoid valve of the piston cooling device is in a state in which the closing command is transmitted, the ECU may be configured to determine that the variation occurs in the oil pressure value from the oil pressure switch or the oil pressure sensor when the oil discharge pressure of the variable proportional control oil pump is varied, and thus the ECU may be configured to determine that an open-stuck failure occurs at the piston cooling device.

When the solenoid valve of the piston cooling device is in a state in which the opening command is transmitted, the ECU may be configured to determine that no variation occurs in the oil pressure value from the oil pressure switch or the oil pressure sensor when the oil discharge pressure of the variable proportional control oil pump is varied, and thus the ECU may be configured to determine that a closing-stuck failure occurs at the piston cooling device. The system may further include a failure display configured to warn a driver of a failure occurrence when the failure occurs at the solenoid valve of the piston cooling device. When the closing-stuck failure is determined to occur at the solenoid valve of the piston cooling device, the ECU may be configured to restrict an output of an engine when a temperature of cooling water of the engine is equal to or greater than a preset temperature.

In accordance with the present disclosure, even after the engine is started, failure due to a stuck of the piston cooling device may be effectively determined according to a variation of an oil pressure using a variable proportional control oil pump that is used for fuel efficiency enhancement. Additionally, in accordance with the present disclosure, when an open-stuck or a closing-stuck occurs at a solenoid valve of the piston cooling device, the jam may be indicated using an engine warning lamp or a display device to prevent excessive emission of exhaust gas. Further, in accordance with the present disclosure, when a closing-stuck occurs at the solenoid valve of the piston cooling device, an engine output may be restricted when a temperature of the engine increases over a predetermined level or greater to prevent damage to the engine.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings.

Figure 1:
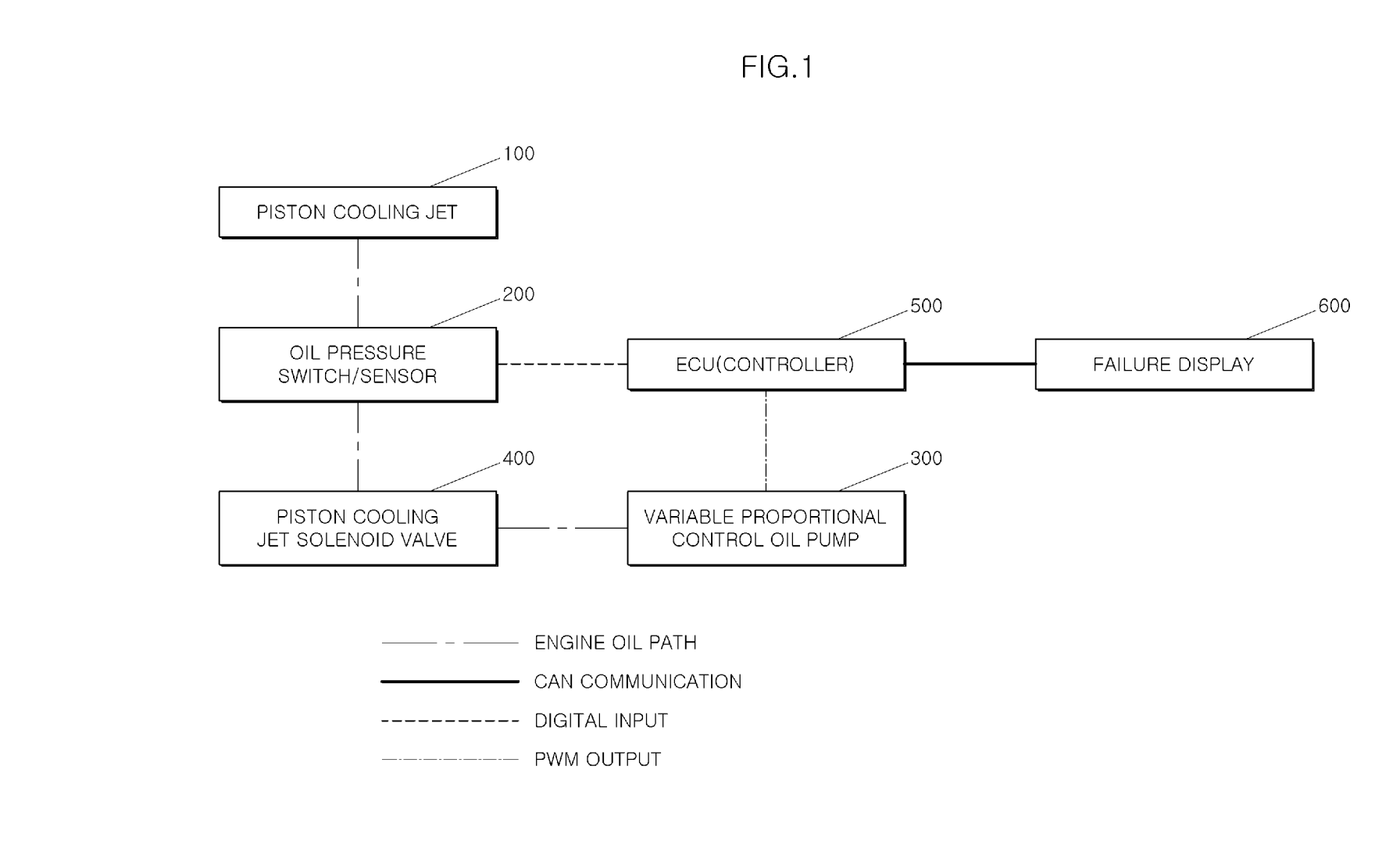
FIG. 1 is a block diagram illustrating a system for diagnosing a solenoid valve failure of a piston cooling jet system according to an exemplary embodiment of the present disclosure.

FIG. 1 is a block diagram illustrating a system for diagnosing a solenoid valve failure of a piston cooling jet system according to the present disclosure. As shown in FIG. 1, a system for diagnosing a solenoid valve failure of a piston cooling jet system according to an exemplary embodiment of the present disclosure may include a piston cooling jet 100, an oil pressure sensor 200, a variable proportional control oil pump 300, a piston cooling jet solenoid valve 400, and an electronic control unit (ECU) 500 (e.g., a controller).

As described above with reference to FIG. 1, the piston cooling jet 100 may be installed at a cylinder block and configured to cool a piston by injecting oil inside the oil pan into the piston. The variable proportional control oil pump 300 may be configured to form an engine oil pressure based on a duty requested by the ECU 500. The variable proportional control oil pump 300 may be configured to adjust an oil pressure even in a low engine speed range and adjust a hydraulic pressure based on a load, thereby being applied to increase reduction of fuel consumption.

The piston cooling jet solenoid valve 400 may be configured to open or close a flow path that supplies the oil from the variable proportional control oil pump 300 to the piston cooling jet 100. When the flow path is opened by the piston cooling jet solenoid valve 400, the oil may be injected to a lower end of a piston with a predetermined pressure or more to cool the piston. Further, when a warming-up of the engine is required, the flow path may be closed using the piston cooling jet solenoid valve 400. An oil pressure switch or the oil pressure sensor 200 may be disposed at a supply flow path of oil supplied to the piston cooling jet 100, and configured to monitor a pressure of the oil supplied to the piston cooling jet 100 and transmit the monitored result to the ECU 500.

As described above, the ECU 500 may be configured to operate the variable proportional control oil pump 300 by requesting a control duty, to thus adjust an oil pressure discharged from the variable proportional control oil pump 300. Further, the ECU 500 may be configured to receive information regarding whether an oil pressure value is varied from the oil pressure switch or the oil pressure sensor 200, and determine whether the piston cooling jet solenoid valve 400 fails. In particular, when a closing command is transmitted to the piston cooling jet solenoid valve 400, the ECU 500 may be configured to request the control duty to vary an oil discharge pressure of the variable proportional control oil pump 300. The ECU 500 may then be configured to monitor whether a variation occurs in the oil pressure in the oil path toward the piston cooling jet 100 after the oil discharge pressure is varied using the oil pressure switch or the oil pressure sensor 200.

When an open-stuck failure occurs (e.g., and open jam) at the piston cooling jet solenoid valve 400, even though the closing command is transmitted to the piston cooling jet solenoid valve 400, the oil path toward the piston cooling jet 100 may be continuously maintained in the opened state. Accordingly, when the variable proportional control oil pump 300 is operated by the ECU 500 to vary the oil discharge pressure, a variation may also occur in the oil pressure in the oil path toward the piston cooling jet 100 based on the variation of the oil discharge pressure.

In particular, occurrence of the variation in the oil pressure refers when the oil pressure in the oil path is varied beyond a predetermined range before and after the variation of the oil discharge pressure by the variable proportional control oil pump 300. The predetermined range is a pressure variation value operating as a reference that may more accurately determine that a failure due to a jam (e.g., stuck) occurs at the piston cooling jet solenoid valve 400. Accordingly, when the variation is determined to occur in the oil pressure in the oil path toward the piston cooling jet 100 by the oil pressure switch or the oil pressure sensor 200, the ECU 500 may be configured to determine that an open-stuck failure occurs at the piston cooling jet 100.

Unlike the above-described exemplary embodiment, according to another exemplary embodiment of the present disclosure, when an open command is transmitted to the piston cooling jet solenoid valve 400, like the above-described exemplary embodiment, the ECU 500 may be configured to request a control duty to vary an oil discharge pressure of the variable proportional control oil pump 300. Then, the ECU 500 may be configured to monitor whether a variation occurs in the oil pressure in the oil path toward the piston cooling jet 100 after the oil discharge pressure is varied using the oil pressure switch or the oil pressure sensor 200.

When a closing-stuck failure occurs at the piston cooling jet solenoid valve 400, even though an opening command is transmitted to the piston cooling jet solenoid valve 400, the oil path toward the piston cooling jet 100 may be continuously maintained in the closed state. Accordingly, even when the variable proportional control oil pump 300 is operated by the ECU 500 to vary the oil discharge pressure, no variation occurs in the oil pressure in the oil path toward the piston cooling jet 100.

Accordingly, when no variation is determined to occur in the oil pressure in the oil path toward the piston cooling jet 100 (e.g., the oil pressure is maintained substantially consistent), the ECU 500 may be configured to determine that a closing-stuck failure occurs at the piston cooling jet 100. In particular, when no variation occurs in the oil pressure may include when a pressure variation does not absolutely occur before and after the variation in the oil discharge pressure by the variable proportional control oil pump 300, and also a case in which a variation occurs in the oil pressure only within a predetermined range.

Further, when the closing-stuck failure occurs at the piston cooling jet solenoid valve 400, the oil may not be supplied to the piston cooling jet 100 and thus, the piston is unable to be effectively cooled. Consequently, when the closing-stuck failure is determined to occur at the piston cooling jet solenoid valve 400, the ECU 500 may be configured to restrict an output of the engine to prevent damage to the engine due to overheating. For example, the ECU 500 may be configured to measure a temperature of cooling water of the engine, and, when the measured temperature of the cooling water of the engine is equal to or greater than a preset temperature, the ECU 500 may be configured to restrict an output torque of the engine to restrict the output of the engine to prevent overheating of the engine. For example, if the measured temperature of the cooling water of the engine is equal to or greater than 118° C., the ECU may be configured to restrict an output torque of the engine to restrict the output of the engine to prevent overheating of the engine.

Meanwhile, according to still another exemplary embodiment of the present disclosure, when the failure is determined to occur at the piston cooling jet solenoid valve 400 by the ECU 500, the system for diagnosing a solenoid valve failure of a piston cooling jet system may further include a failure display 600 configured to warn a driver of a failure occurrence. In other words, the ECU 500 may be configured to output a notification or a warning to a driver or user regarding the failure.

In particular, the failure display 600 may be configured to warn the driver of the failure occurrence by flickering an engine warning lamp or displaying the failure occurrence on a cluster within the vehicle. Through such an operation, the driver may recognize that an abnormality occurs at the piston cooling oil jet system, thereby performing an appropriate response such as maintenance. In addition, the failure display 600 may be configured to store a diagnostic trouble code (DTC) related to the failure of the piston cooling oil jet system in a storage device inside the vehicle.

Figure 2:
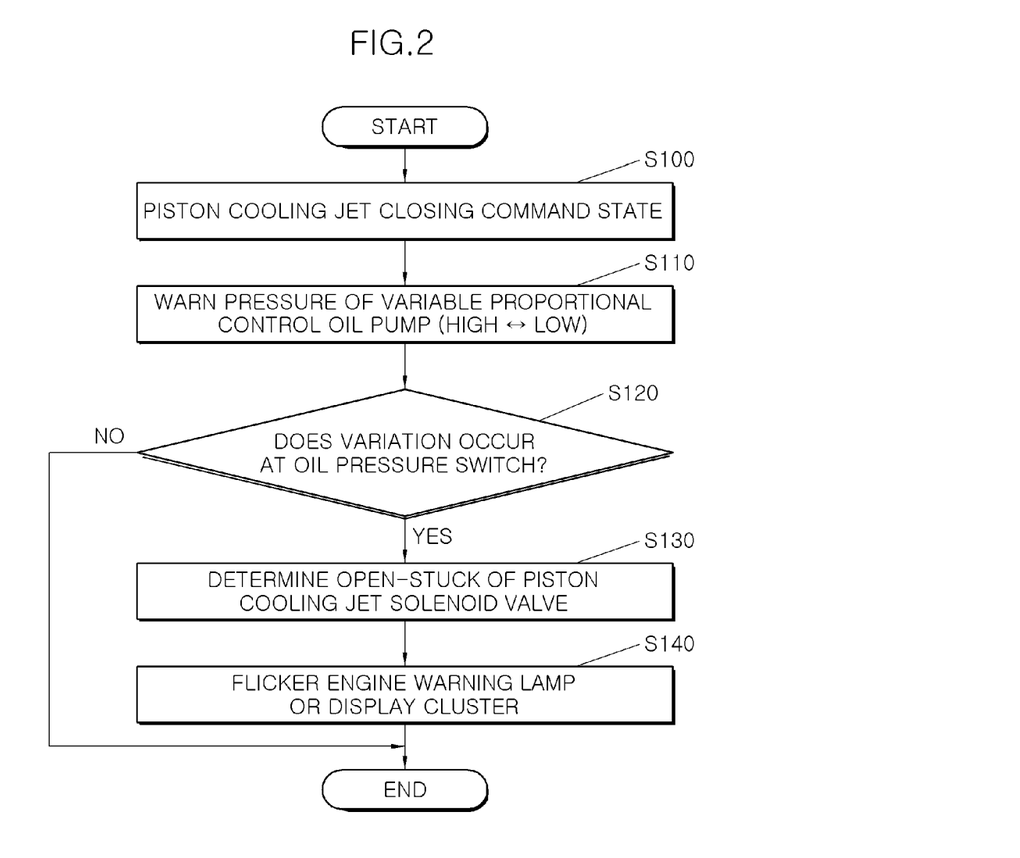
FIG. 2 is a flowchart illustrating a method for diagnosing a solenoid valve failure of the piston cooling jet system according to an exemplary embodiment of the present disclosure.

FIG. 2 is a flowchart illustrating a method for diagnosing a solenoid valve failure of a piston cooling jet system according to an exemplary embodiment of the present disclosure using the system for diagnosing a failure, which is illustrated in FIG. 1. In the exemplary embodiment of FIG. 2, the piston cooling jet solenoid valve 400 is in a state in which a command for closing an oil supply flow path toward the piston cooling jet 100 has been transmitted to the piston cooling jet solenoid valve 400 (S100).

In such a state, the ECU 500 may be configured to request a control duty to the variable proportional control oil pump 300, and operate the variable proportional control oil pump 300 to vary the oil pressure delivered therefrom (S110). In particular, the control may be performed in a direction in which the oil discharge pressure increases, or in a direction in which the oil discharge pressure decreases. The variable proportional control oil pump 300 may be operated to allow a variation to occur in the oil discharge pressure when compared to a previous oil discharge pressure irrespective of an increase or a decrease of the oil discharge pressure.

Further, after the oil discharge pressure is varied, the ECU 500 may be configured to monitor whether a variation occurs in the oil pressure in the oil path toward the piston cooling jet 100 through the oil pressure switch or the oil pressure sensor 200 (S120). When the ECU 500 senses the variation in the oil pressure in the oil path toward the piston cooling jet 100 through the operation S120 after the oil discharge pressure is varied in the operation S110, as described above, the ECU 500 may be configured to determine that the open-stuck failure occurs at the piston cooling jet solenoid valve 400 (S130). The ECU 500 may then be configured to warn the driver of the failure occurrence at the piston cooling jet system by flickering the engine warning lamp or displaying the failure occurrence on the cluster within the vehicle using the failure display 600 (S140).

Figure 3:
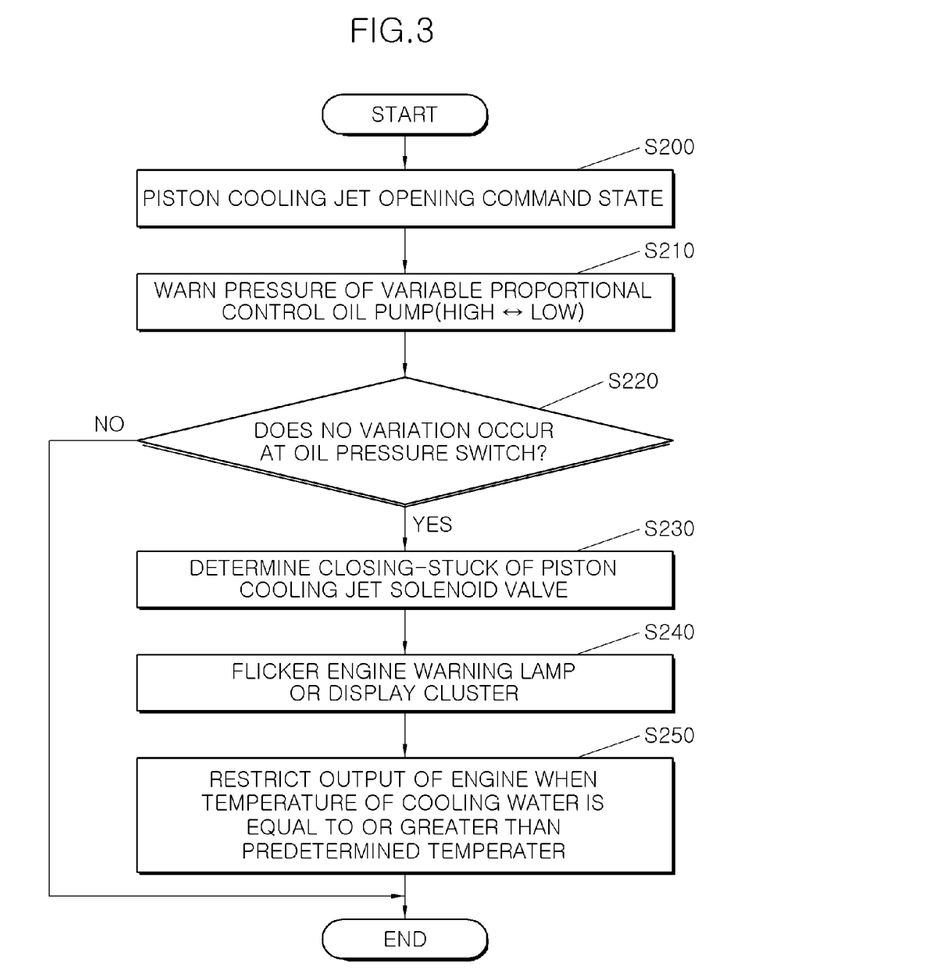
FIG. 3 is a flowchart illustrating a method for diagnosing a solenoid valve failure of the piston cooling jet system according to another exemplary embodiment of the present disclosure.

FIG. 3 is a flowchart illustrating a method for diagnosing a solenoid valve failure of a piston cooling jet system according to another exemplary embodiment of the present disclosure using the system for diagnosing a failure, which is illustrated in FIG. 1. Unlike the exemplary embodiment of FIG. 2, in the exemplary embodiment of FIG. 3, the piston cooling jet solenoid valve 400 is in a state in which a command for opening the oil supply flow path toward the piston cooling jet 100 has been transmitted to the piston cooling jet solenoid valve 400 (S200).

In such a state, the ECU 500 may be configured to request a control duty to the variable proportional control oil pump 300, and operate the variable proportional control oil pump 300 to vary the oil pressure delivered therefrom (S210). At this point, as described above, the variable proportional control oil pump 300 may be operated to allow a variation to occur in the oil discharge pressure when compared to a previous oil discharge pressure irrespective of an increase or a decrease of the oil discharge pressure. Further, after the oil discharge pressure is varied, the ECU 500 may be configured to monitor whether no variation occurs in the oil pressure in the oil path toward the piston cooling jet 100 through the oil pressure switch or the oil pressure sensor 200 (S220).

When the ECU 500 senses no variation in the oil pressure in the oil path toward the piston cooling jet 100 through the operation S220 after the oil discharge pressure is varied in the operation S210, as described above, the ECU 500 may be configured to determine that the closing-stuck failure occurs at the piston cooling jet solenoid valve 400 (S230). Further, similar to the exemplary embodiment illustrated in FIG. 2, the ECU 500 may be configured to warn the driver of the occurrence of the failure at the piston cooling jet system by flickering the engine warning lamp or displaying the occurrence of the failure on the cluster within the vehicle using the failure display 600 (S240).

In addition, when the ECU 500 determines that the closing-stuck failure occurs at the piston cooling jet solenoid valve 400, to prevent damage to the engine due to overheating of the engine, the ECU 500 may be configured to restrict the output of the engine by limiting the output torque of the engine when the temperature of the cooling water of the engine is equal to or greater than a preset temperature (S250).

In accordance with the above-described exemplary embodiments of the present disclosure, even after the engine is started, the oil discharge pressure may be intentionally varied using the variable proportional control oil pump, to determine failure due to the stuck of the piston cooling jet solenoid valve more accurately.

Further, in accordance with the exemplary embodiments of the present disclosure, when the open-stuck failure or the closing-stuck failure occurs at the piston cooling jet solenoid valve 400, occurrence of the failure may be indicated by the engine warning lamp or may be displayed through the display device and thus, excessive emission of exhaust gas may be prevented. Furthermore, in accordance with to the exemplary embodiments of the present disclosure, when the closing-stuck failure occurs at the piston cooling jet solenoid valve 400, the output of the engine may be restricted when the temperature of the engine increases over a predetermined temperature and thus, damage to the engine may be prevented.

While the present invention has been described with respect to the specific exemplary embodiments, it will be apparent to those skilled in the art that various changes and modifications may be made without departing from the spirit and scope of the invention as defined in the following claims.

What is claimed is:
1. A method for diagnosing a failure of a solenoid valve of a piston cooling device, comprising:
    when an opening command or a closing command of the solenoid valve is transmitted to inject oil from the piston cooling device, varying, by a controller, a pressure in a variable proportional control oil pump;

monitoring, by the controller, a variation of an oil pressure in an oil flow path of the piston cooling device according to a variation of the pressure in the variable proportional control oil pump, the oil pressure in the oil flow path being measured using an oil pressure switch or an oil pressure sensor disposed at a supply flow path of oil supplied to the piston cooling device; and after the opening command or the closing command of the solenoid valve is transmitted, determining, by the controller, whether or not a failure occurs at the solenoid valve of the piston cooling device based on whether or not the variation occurs in the oil pressure in the oil flow path measured by the oil pressure switch or the oil pressure sensor in accordance with the variation of the pressure of the variable proportional control oil pump.

2. The method of claim 1, further comprising:

when the solenoid valve is in a state in which the closing command is transmitted, varying, by the controller, an oil discharge pressure of the variable proportional control oil pump;

determining, by the controller, whether a variation occurs at an oil pressure switch configured to monitor a pressure of oil supplied to the piston cooling device; and when a variation occurs in the oil pressure in the oil flow path, determining, by the controller, that an open-stuck failure occurs at the solenoid valve of the piston cooling device.

3. The method of claim 1, further comprising:

when the solenoid valve is in a state in which the opening command is transmitted, varying, by the controller, an oil discharge pressure of the variable proportional control oil pump;

determining, by the controller, whether a variation occurs at an oil pressure switch configured to monitor a pressure of oil supplied to the piston cooling device; and when no variation occurs in the oil pressure in the oil flow path, determining, by the controller, that a closing-stuck failure occurs at the solenoid valve of the piston cooling device.

4. The method of claim 2, further comprising:

when the failure is determined to occur at the piston cooling device, warning, by the controller, a driver of a failure occurrence of the piston cooling device using a failure display.

5. The method of claim 3, further comprising:

when the failure is determined to occur at the piston cooling device, warning, by the controller, a driver of a failure occurrence of the piston cooling device using a failure display.

6. The method of claim 3, further comprising:

when the failure is determined to occur at the piston cooling device, restricting, by the controller, an output of an engine when a temperature of cooling water of the engine is equal to or greater than a preset temperature.

7. A system for diagnosing a failure of a solenoid valve of a piston cooling device, comprising:

a piston cooling device installed at a cylinder block and configured to inject oil in an oil pan into a piston;

an oil pressure switch or an oil pressure sensor configured to monitor a pressure of oil supplied to the piston cooling device;

a variable proportional control oil pump configured to form an oil pressure of an engine;

a solenoid valve of the piston cooling device configured to open and close a supply flow path supplying oil, which is formed by the variable proportional control oil pump, to a piston cooling jet; and an electronic control unit (ECU) configured to operate the variable proportional control oil pump, receive information regarding whether a variation occurs in an oil pressure value from the oil pressure switch or the oil pressure sensor disposed at a supply flow path of oil supplied to the piston cooling jet, transmit an opening command or a closing command to the solenoid valve of the piston cooling device, operate the variable proportional control oil pump to vary an oil discharge pressure discharged therefrom, and determine whether or not a failure occurs at the solenoid valve of the piston cooling device based on whether or not the variation occurs in the oil pressure value measured by the oil pressure switch or the oil pressure sensor in accordance with the variation of the pressure of the variable proportional control oil pump after the opening command or the closing command of the solenoid valve is transmitted.

8. The system of claim 7, wherein when the solenoid valve of the piston cooling device is in a state in which the closing command is transmitted, the ECU is configured to determine that the variation occurs in the oil pressure value from the oil pressure switch or the oil pressure sensor when the oil discharge pressure of the variable proportional control oil pump is varied, and determine that an open-stuck failure occurs at the piston cooling device.

9. The system of claim 7, wherein when the solenoid valve of the piston cooling device is in a state in which the opening command is transmitted, the ECU is configured to determine that no variation occurs in the oil pressure value from the oil pressure switch or the oil pressure sensor when the oil discharge pressure of the variable proportional control oil pump is varied, and determine that a closing-stuck failure occurs at the piston cooling device.

10. The system of claim 7, further comprising:

a failure display configured to warn a driver of a failure occurrence when the failure occurs at the solenoid valve of the piston cooling device.

11. The system of claim 9, wherein when the closing-stuck failure is determined to occur at the solenoid valve of the piston cooling device, the ECU is configured to restrict an output of an engine when a temperature of cooling water of the engine is equal to or greater than a preset temperature.

12. The system of claim 11, wherein the output of the engine is restricted by limiting the output torque of the engine when the temperature of the cooling water of the engine is equal to or greater than the preset temperature.

* * * * *